J. M. MERROW.
TRIMMING CUTTER FOR SEWING MACHINES.
APPLICATION FILED DEC. 9, 1905.
907,619.
Patented Dec. 22, 1908.
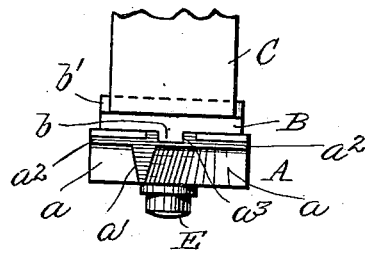
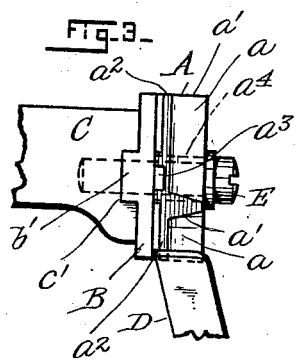
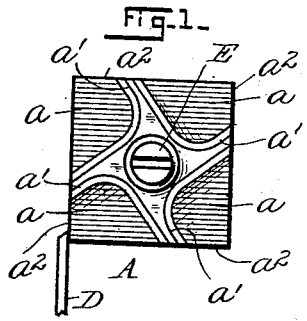
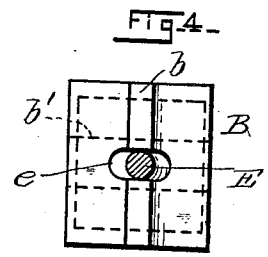
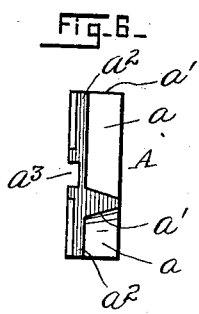
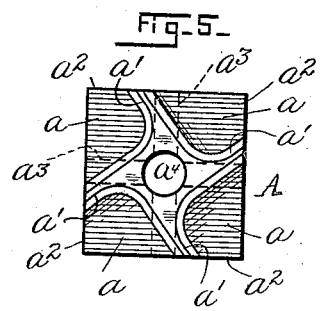
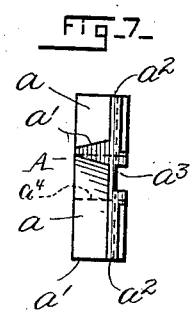
WITNESSES
INVENTOR
Joseph M. Merrow
BY Church & Church
his ATTORNEYS

UNITED STATES PATENT OFFICE.

JOSEPH M. MERROW, OF HARTFORD, CONNECTICUT, ASSIGNOR TO THE MERROW MACHINE COMPANY, OF HARTFORD, CONNECTICUT, A CORPORATION OF CONNECTICUT.

TRIMMING-CUTTER FOR SEWING-MACHINES.

No. 907,619.

Specification of Letters Patent.

Patented Dec. 22, 1908.

Application filed December 9, 1905. Serial No. 291,132.

*To all whom it may concern:*

Be it known that I, JOSEPH M. MERROW, a citizen of the United States, residing in the city and county of Hartford, State of Connecticut, have invented certain new and useful Improvements in Trimming-Cutters for Sewing-Machines, of which the following is a full, clear, and exact description, reference being had to the accompanying drawings, forming a part of this specification, and to the figures and letters of reference thereon.

This invention relates to cutters for trimming or cutting material.

The object of this invention is to provide a cutter possessing several cutting edges and a guard or guide for each cutting edge, any one of said cutting edges with its guide being adapted to be used at one time in conjunction with a companion cutter, and the others in turn being adapted to be brought into use one by one as those previously used become worn or dull. The cutting edges and guides are so arranged that each guide and the whole face containing the adjacent cutting edge may be ground in a single plane without changing the form of the cutting edge.

In the accompanying drawings forming a part of this specification—Figure 1 is a front elevation of the cutter showing its retaining screw and a portion of a companion cutter. Fig. 2 is a plan view of the cutter and its carrier and also shows a shim between the two. Fig. 3 is a side elevation of the parts shown in Fig. 2. Fig. 4 is a front elevation of the shim. Fig. 5 is a front elevation of the cutter detached. Fig. 6 is an elevation of the cutter as seen from the left hand of Fig. 5. Fig. 7 is an elevation of the cutter as seen from the right hand of Fig. 5.

Similar letters of reference indicate like parts throughout the drawings.

A indicates the cutter as a whole; B, the shim; C, the cutter carrier; and D, the companion cutter.

The cutter A is made from a polygonal block (preferably four sided as shown) of steel and rectangular in cross sections. One of its larger faces, which I call its front face, is routed out as at $a\ a\ a\ a$ to form cutters with cutting edges at $a'\ a'\ a'\ a'$ and four guides $a^2\ a^2\ a^2\ a^2$, one for each of the cutters and the latter are preferably made at an acute angle with the edge or face forming its guide. The routing on the front is preferably made in a plane parallel with the larger faces of the block and the side walls left by said routing are at an obtuse angle with bottom wall of the routing, as clearly shown in the figures, thus giving a pitch or inclination to the cutting edge.

The cutter A is adjustably mounted on a shim B, the rear face of the cutter A being provided with guide ways or grooves $a^3$ to fit a tongue $b$ on the front face of the said shim. The said grooves are so disposed as to permit adjustment of the cutting edge $a'$ to properly coöperate with the companion cutter when reciprocated in the plane in which the cutting edge is ground. In the present case, there are two grooves $a^3$ at right angles to each other, one being parallel with two of the edges of the block and the other being parallel with the other two edges of the block or cutter as a whole, thus each guide way or groove serves to position two cutting edges.

The tongue $b$ on the face of the shim next to the cutter is preferably vertical as shown, so that the cutter may be adjusted bodily up and down upon the shim. To permit such adjustment the screw hole $a^4$ through the body of the cutter is made larger than the body of the screw E which retains the cutter. The horizontal tongue $b'$ on the rear face of the shim B fits the groove $c'$ in the front face of the carrier C and the screw hole $e$ in the shim B is slotted to permit the horizontal adjustment of the cutter A bodily, the shim also moving with the cutter for such adjustment.

It will be understood that the carrier C is ordinarily moved up and down by any known mechanism suitable for the purpose and that the companion cutter D is ordinarily held stationary on some part of the machine, although no mechanism for moving either of the cutters or for supporting the companion cutter is shown, as such parts form no part of the present invention.

The cutter A can be ground upon its edge faces, each face in a single plane to sharpen its cutting edges, and to keep the guides for the cutting edges each in the same plane respectively as its adjacent cutting edge. The path of movement of the cutter A should be practically parallel with the adjacent side of the companion cutter and thus the guide upon the acting side of the cutter A will always be in contact with the side of the companion cutter and will protect the edge $a'$ of the cutter from undue conflict therewith.

When one of the four cutting edges of the cutter A becomes dull, the cutter may be rotated and another cutting edge a' brought into use and so on until all of the cutting edges have been utilized.

Having thus described my invention, what I claim as new and desire to secure by Letters Patent, is:—

1. A polygonal cutter each of the edge faces of which embodies a cutting edge extending transversely to the rear face of the cutter and a guide for the cutting edge extending in the same plane therewith, substantially as described.

2. A polygonal cutter having opposite edge faces in approximately parallel planes and each embodying a cutting edge extending transversely to the rear face of the cutter and a guide for the cutting edge extending in the plane of one face of the cutting edge of the cutter, substantially as described.

3. A doubly reversible cutter, having four edge faces each embodying an acute angle cutting edge extending transversely of the cutter and a guide extending in the plane of the cutter, each cutting edge and its guide being ground or made in the same plane.

4. A doubly reversible cutter provided with four acute angular cutting edges with a guide for each cutting edge, the face of each of said guides being in the same plane as the corresponding cutting edge, substantially as described.

5. A doubly reversible cutter having guideways upon one of its faces, substantially as described.

6. A polygonal cutter each of the edge faces of which embodies a transversely extending cutting edge and a guide therefor extending in the same plane, the front face of the said cutter being routed out to form the cutting edges and the rear face of said cutter being provided with guideways corresponding to the said cutting edges, substantially as described.

7. A polygonal trimming cutter having cutting edges and guides therefor on its edge faces each cutting edge and its guide being ground in the same plane and guide ways on the rear face of the cutter, substantially as described.

JOSEPH M. MERROW.

Witnesses:
ALONZO M. LUTHER,
W. C. W. STEWART.